J. M. TRINER.
WEIGHING SCALE.
APPLICATION FILED APR. 29, 1907.

946,289.

Patented Jan. 11, 1910.
4 SHEETS—SHEET 1.

Witnesses:

Inventor:
Jas. M. Triner
by Brown & Hopkins
Attys

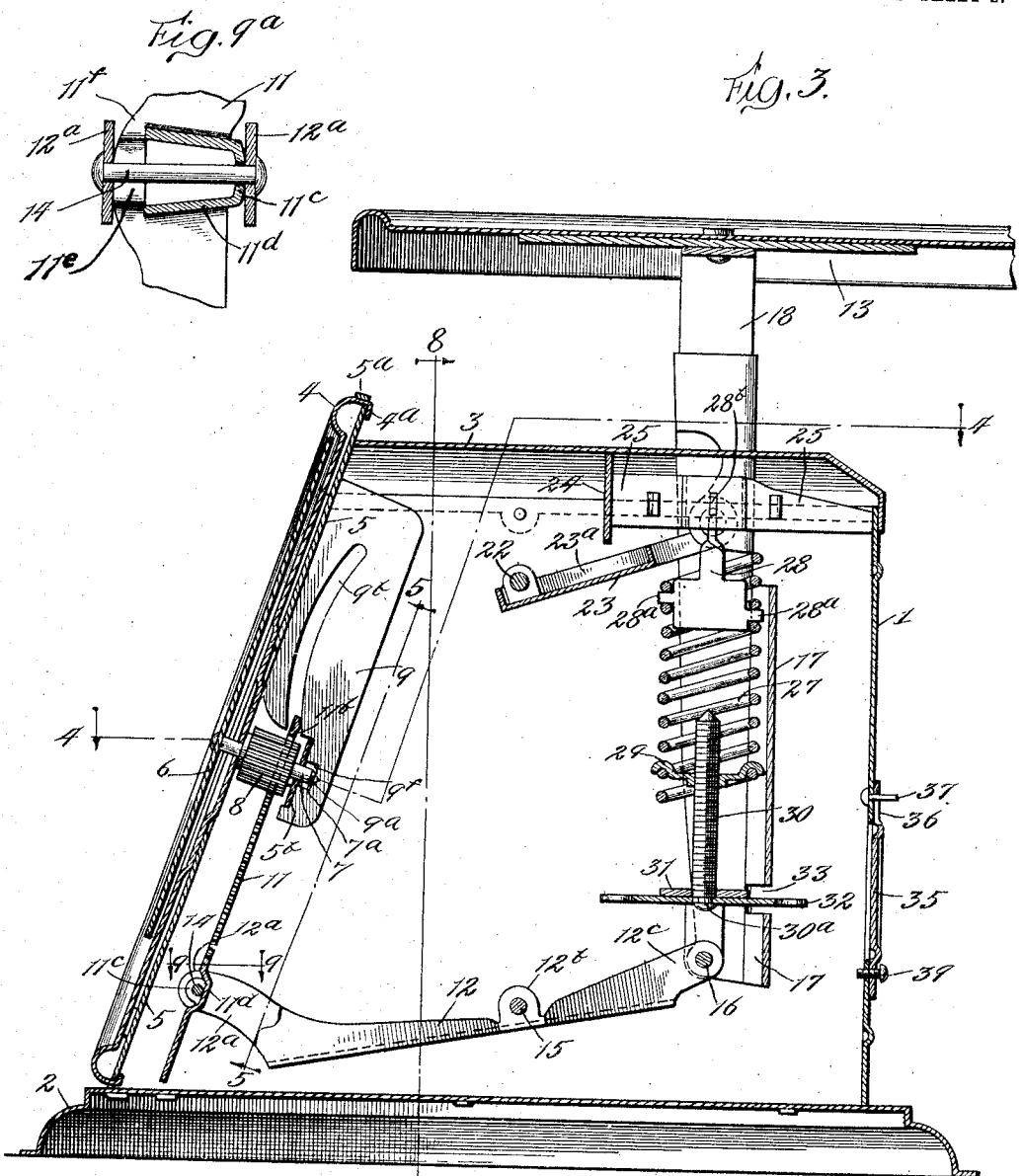

J. M. TRINER.
WEIGHING SCALE.
APPLICATION FILED APR. 29, 1907.
946,289.
Patented Jan. 11, 1910.
4 SHEETS—SHEET 3.
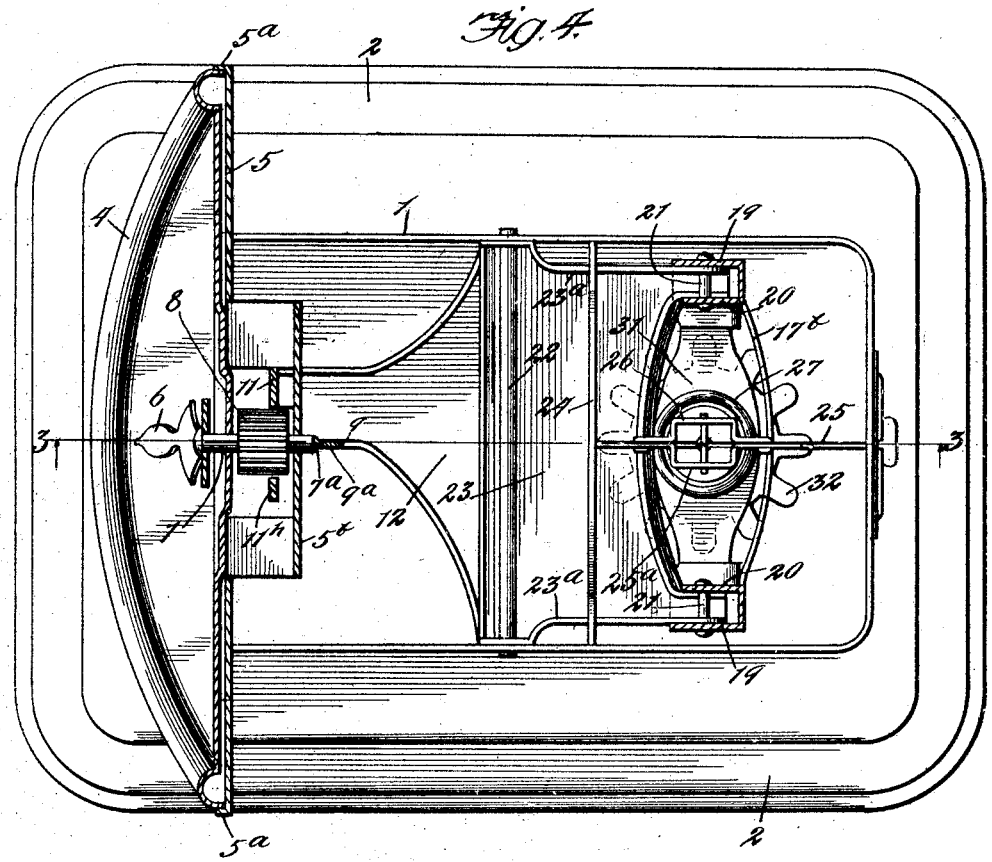
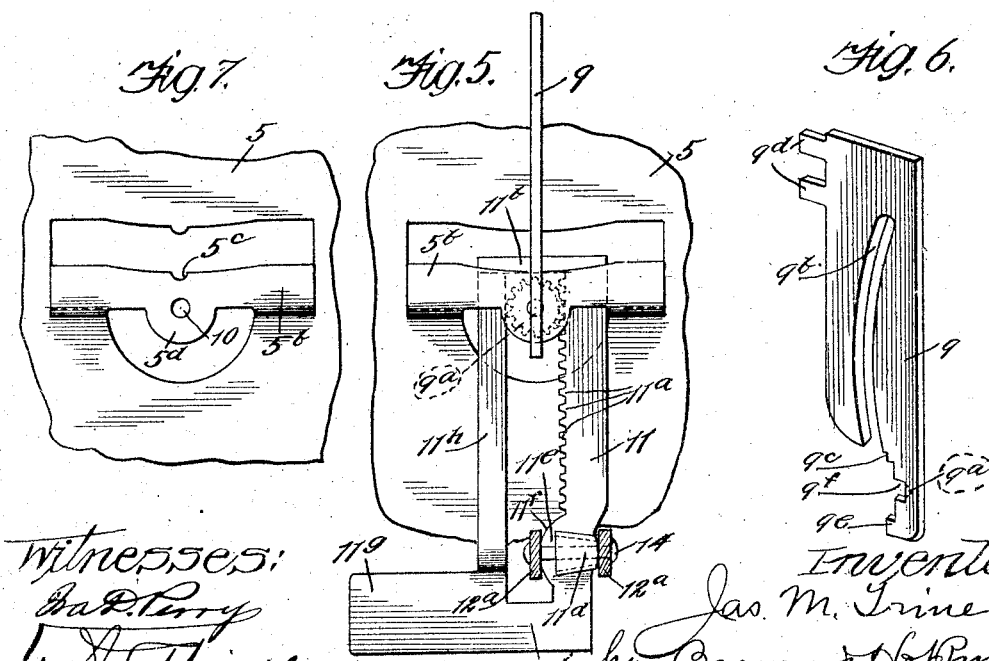

J. M. TRINER.
WEIGHING SCALE.
APPLICATION FILED APR. 29, 1907.
946,289.
Patented Jan. 11, 1910.
4 SHEETS—SHEET 4.
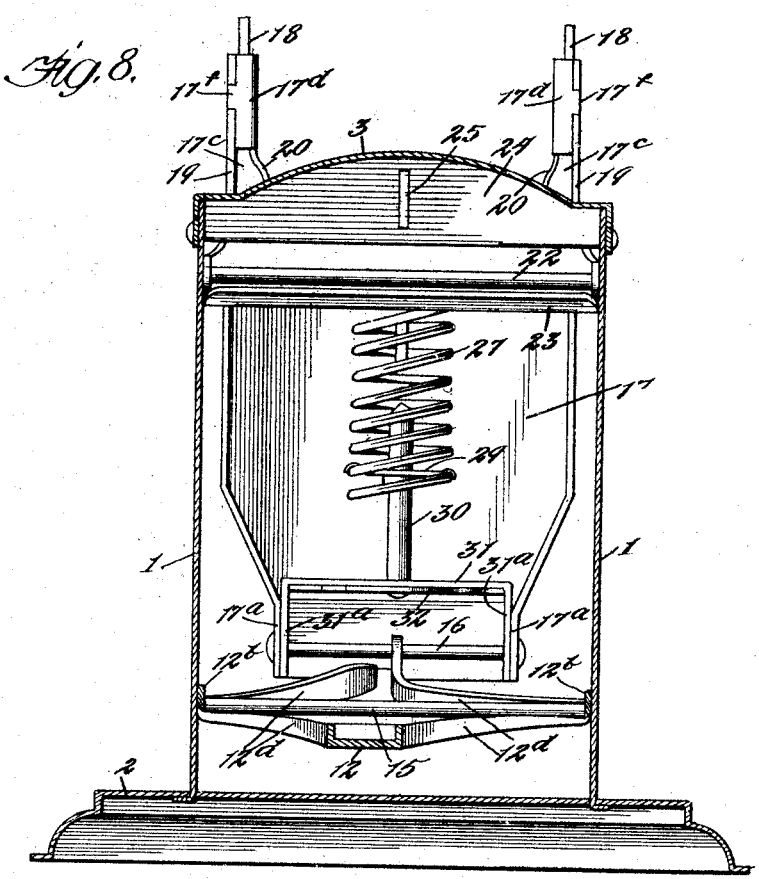
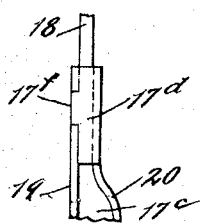
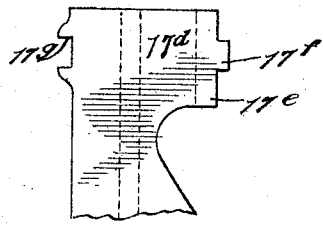
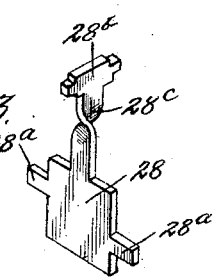
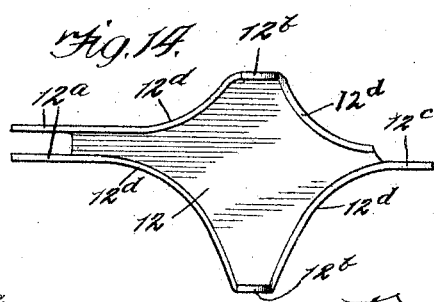

UNITED STATES PATENT OFFICE.

JAMES M. TRINER, OF CHICAGO, ILLINOIS.

WEIGHING-SCALE.

946,289.

Specification of Letters Patent.   Patented Jan. 11, 1910.

Application filed April 29, 1907.   Serial No. 371,009.

*To all whom it may concern:*

Be it known that I, JAMES M. TRINER, a citizen of the United States, residing at Chicago, in the county of Cook and State of Illinois, have invented certain new and useful Improvements in Weighing-Scales, of which the following is a full, clear, and exact specification.

The invention relates to weighing-scales in which the pointer is mounted on the pivoted arbor and operated from the platform-standard by means of a rack-and-pinion movement and more particularly to that class of scales having an angularly-disposed dial-scale over which the pointer moves as shown and described in Letters Patent of the United States No. 819,325, granted me May 1st, 1906.

One of the objects of my invention is to provide certain improvements in the means for operating the pointer by the aforesaid rack-and-pinion movement.

In order to reduce the cost of manufacture of a scale of this class to the minimum, it is desirable that substantially all parts be produced by dies, formers, punches, etc., the parts usually being made from steel or other suitable material in the form of sheets of any desired thickness, and a further object of the invention is to provide certain improvements in the manner of constructing the dial and portions of the casing adjacent thereto by which greater economy in manufacture and strength and efficiency in the parts are secured.

A further object of the invention is to provide an improved form of a single piece main rocking lever.

A still further object of the invention is to provide an improved form of structure for securing the supporting spring to the casing.

With these ends in view my invention consists in certain features of novelty in the construction, combination, and arrangement of parts whereby the said objects and certain other objects hereinafter appearing are attained all as hereinafter fully described with reference to the accompanying drawings and more particularly pointed out in the claims.

Figure 1:
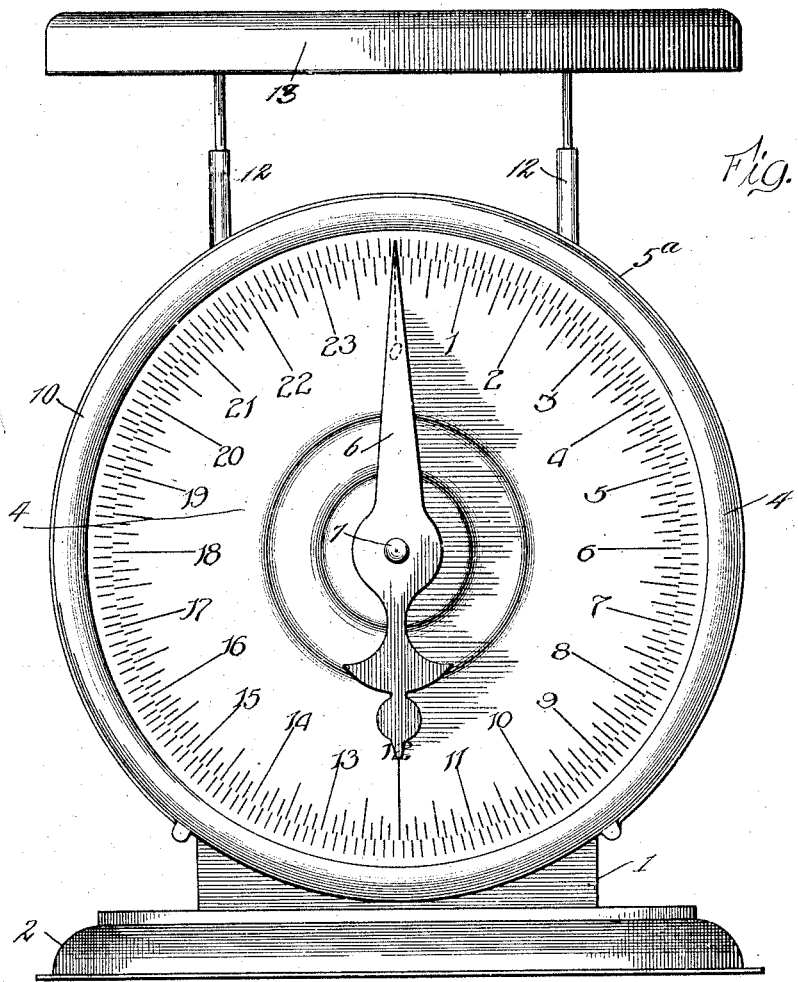
Figure 2:
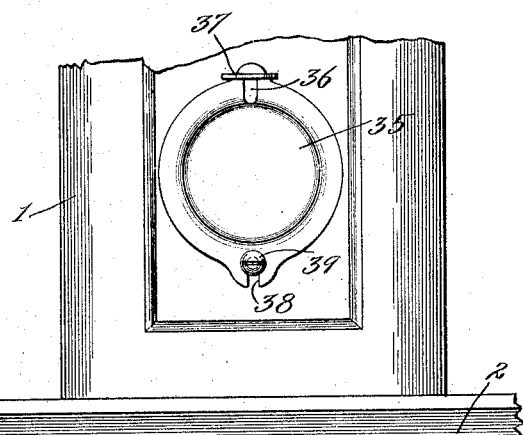

In the said drawings, Figure 1 is a face view or front elevation of the improved scale. Fig. 2 is a fragmentary view of a part of the back of the casing. Fig. 3 is a vertical section on line 3—3, Fig. 4. Fig. 4 is a plan section on the line 4—4, Fig. 3. Fig. 5 is a detail front elevation of the rack and pinion mechanism, on line 5—5, Fig. 3. Fig. 6 is a perspective view of the rack bar guide which part also forms a bearing and a partial support for the inner end of the arbor on which is mounted the pinion and pointer. Fig. 7 is a rear plan view of a portion of the circular front casing plate which forms a backing for the dial the view showing the manner of striking up the yoke integrally from this plate which yoke together with the guide member shown in Fig. 6 forms a support for the rack and pinion. Fig. 8 is a vertical section of the scale on line 8—8, Fig. 3. Fig. 9 is a detail view of the pivotal connection between the rack bar and the rocking lever, on line 9—9, Fig. 3. Fig. 9$^a$ is a detail sectional view on line 9$^a$—9$^a$, Fig. 9. Fig. 10 is an enlarged front elevation of one of the standard sockets. Fig. 11 is the blank from which the same is produced. Fig. 12 is a perspective view of the nut for the adjusting screw. Fig. 13 is a perspective view of the irregular member which connects the upper end of the supporting spring to the supporting frame near the top of the casing. Fig. 14 is a plan view of the main rocking lever which communicates the movement of the elastically supported platform to the rack bar.

1 is a casing of suitable form and construction, preferably made of sheet metal and supported upon a proper base 2, the top being closed by removable cover 3. As shown in Fig. 3 the front of the casing is formed on an incline with the dial of the scale closing the front and also arranged on the same incline, so as to be in a convenient position for reading.

The dial indicated by the numeral 4 is preferably circular in form and is supported by plate 5 which is also of circular formation and has its edges formed to extend slightly beyond the periphery of the dial and flanged or crimped upwardly as indicated at 5$^a$ thus furnishing a support. The dial is provided with a pointer 6 mounted upon a central arbor 7, which carries the pinion 8 preferably formed integrally with the arbor. The arbor 7 is journaled in the dial supporting plate 5 and the dial 4, and the inner end of the pin is provided with a pointed or conical end 7$^a$ which engages in a corresponding conical depression near the lower end of the guide plate 9, said depression being indicated in the illustration at 9$^a$ (see Figs. 3, 4, 5 and 6). In addition to the bearing formed at 9ª on the guide plate 9 the arbor and pinion are further supported at the inner end by the integral yoke 5ᵇ which is struck up from the material and the plate 5 in the manner indicated in Figs. 3, 4, 5 and 7. This yoke 5ᵇ is provided with a suitable bearing 10 encircling the arbor adjacent to the inner bearing and in this manner the pinion is provided at both ends with sufficient but inexpensive support.

Communicating with the pinion 8 is a flat rack bar 11 which is considerably less in width than the face of the pinion, so that while it travels longitudinally over the pinion it may also move lengthwise of the axis of the pinion without getting out of mesh therewith. This rack bar is preferably formed from an L shaped piece of sheet metal as illustrated (see Fig. 5), the vertical member thereof being slotted longitudinally and teeth 11ª formed at one side of this slot for the purpose of engaging the pinion. The vertical member of this rack bar is in the form of a yoke with both of its ends closed, the upper end being indicated at the reference character 11ᵇ and the lower end as indicated at 11ⁱ. In assembling, this mode of constructing the rack bar makes it necessary that it be inserted over the arbor and pinion before these parts are permanently secured in position, and the upper portion 11ᵇ in particular furnishes a stop which prevents the rack bar from becoming disengaged from the pinion at the lowermost limit of its movement. The curved edge 11ᶠ at the lower extremity of the toothed portion of the rack bar also provides a stop for the pinion at the opposite end of the rack bar. The upper end of the rack bar 11 is also confined between the pinion and one of the arms of the yoke 5ᵇ whereby it is held in mesh during its reciprocating motion the lower end of the rack bar being pivotally connected to one end of the rocking lever 12 which is pivoted to the casing 1 and the other end of the same is operatively connected with the standard of the platform 13, as will be presently described, so that as the platform is depressed or rises and falls the rack bar 11 will be correspondingly moved or reciprocated and the pointer 6 thereby revolved through the intermediary of the pinion 8 a corresponding degree.

As the rocking lever 12 oscillates it of course carries the lower end of the rack bar toward and from the dial 4 and its supporting plate 5 and would ordinarily destroy the proper angular relation between the rack bar and the pinion; but in order that the upper end of the rack bar may move longitudinally of the axis of the pinion in unison with its lower end, and thus maintain this proper angular relation, the guide plate 9 heretofore referred to as a support for the inner end of the arbor is provided with a curved slot 9ᵇ and into this slot 9ᵇ the upper member of the yoke 11ᵇ of the rack 11 is adapted to travel (see Figs. 3, 5 and 6), so that as the rack bar 11 moves upwardly and its lower end consequently moves toward the dial the upper end 11ᵇ of the rack 11 will also ride upwardly in the slot 9ᵇ on the guide member 9 which slot being curved or inclined from end to end toward the center or to mid-length will push the upper end of the rack bar toward the dial 4 as rapidly as the lower end is thus moved by the lever 12, and when the lever 12 rises beyond that point where it moves the rack bar 11 toward the dial and begins to move it away from the dial, as will be understood, the curved guide slot 9ᵇ will correspondingly move the upper end of the rack bar away from the dial said upper end of the rack bar following the inclined character of the upper end of the slot until it has reached the upper limit of the slot or until the upward motion of the arm 12 ceases. In thus constructing the rack bar 11 and the curved guide slot 9ᵇ for producing the described result the curved slot may be given a length which is substantially equal with the reciprocating movement of the rack bar and should be so positioned in relation to the rack bar that the upper cross member 11ᵇ will be contiguous to the lower end of the guide slot 9ᵇ when the lever 12 is at the limit of its lower movement and the cross member 11ᵇ of the rack bar should be substantially in the same position with reference to the upper limit of the guide slot 9ᵇ when the lever 12 is at the limit of its upward movement, the radius of the arc of the guide slot 9ᵇ being substantially equal to that of the arc described by the end of the lever having pivotal connection with the rack bar 11.

In order that the rack bar 11 may move everywhere without resisting the rising and falling motion of the platform 13 in any appreciable degree, it is important that the rack bar be pivoted on two axes at substantially right angles to each other, so that it may move both toward and from the dial, as well as transversely in a plane at right angles to the axis of the pinion. With that end in view the lower end of the rack bar immediately below the termination of the teeth 11ª is provided with an ear 11ᶜ through which passes a pin 14 which pivots the rack bar to the ears 12ª of lever 12. The pin 14 is further secured in the rack bar by passing on one side of a depressed portion 11ᵈ formed in the material of the rack bar 11 thence passing under a loop 11ᵉ formed integral of the same material but being deflected in a plane opposite the deflection of the portion 11ᵈ. In this manner the pin 14 is retained between these oppositely deflected portions 11ᵈ and 11ᵉ. The portion 11ᵉ is preferably so shaped as to form a longitudinal housing or somewhat enlarged pivotal connection by means of which the end of the pivot 14 adjacent thereto is provided with a given amount of play or lost motion. The pivotal connection however between the ear 11$^c$ and the pivot 14 is a snug fit. It will be seen that this construction will permit the rack bar 11 to undergo a transverse movement transversely of the axis of the pinion to allow for any lateral or side play of the arm 11 without causing the pinion and rack bar to bind. In order, however, that the rack bar may not be objectionably loose in its connection with the lever 12 and with the pinion the edge 11$^f$ of the rack bar adjacent to the housing 11$^e$ comprises a curved portion being formed on the arc of the circle corresponding to the arc of movement of the adjacent ear 12$^a$ as it is given a limited amount of movement on the pivotal connection formed between the ear 11$^c$ and the pivot pin 14. It will be seen that as the inner ear 12$^a$ moves in relation to the rack bar 11 it will follow the curved surface 11$^f$ and thus prevent an undue amount of play or lost motion at this connection. This desirable result of preventing undue looseness in the part is further secured by a counterweight 11$^g$ which forms the lower leg of the L shaped rack bar 11 and is connected thereto by the guide branch 11$^h$ opposite the teeth 11$^a$ on the rack bar and by the lower cross member 11$^i$. Inasmuch as this member 11$^g$ stands in an inclined position, as well as extending laterally from the toothed section of the rack bar it serves to hold the teeth of the rack bar in engagement with the pinion and at the same time normally tends to revolve the rack bar 11 on the pivotal connection between the pin 14 and the ear 11$^c$ thus keeping the housing 11$^e$ in constant engagement with the pin 14.

The lever 12 is enlarged laterally near its central portion (see Fig. 14) and is provided at the extremities of these lateral projections with upwardly extending ears 12$^b$ which take the pin 15 for pivotally securing the lever to the casing 1. The rear end of the lever terminates in an ear 12$^c$ which is pivoted on a cross rod 16 which is passed through and preferably riveted in side flanges 17$^a$ of the platform standard 17 and which standard is of the peculiar construction best shown in Figs. 3 and 8. It is formed of a plate which is bowed outwardly at the back, as shown at 17$^b$, to stiffen it and which is provided at its upper end with upward extensions 17$^c$, carrying sockets 17$^d$, which receive two stems 18 on the bottom of the platform 13. The projections 17$^d$ are formed with side flanges 19 and 20 through which pass short pivots 21 which connect the upper end of the standard to the arm pivoted on a cross rod 22 and which arm is parallel with the rearward extension of the lever 12 so as to maintain the equilibrium of the standard as it rises and falls, and this arm just referred to is constituted by a plate 23 having surrounding flanges 23$^a$ which stiffen it and serve as connections with the pivots 21 and also with the rod 22.

Arranged above the arm 23 and rigidly secured to the casing 1 is a cross bar 24, and upon this bar rests one end of the second cross bar 25 whose other end is secured in any suitable manner to the rear wall of the casing 1 near the top thereof. The cross bar 25 is preferably formed up out of a strip of sheet metal having suitable diminished portions at the extremities thereof not shown in the drawings for securing the same to the cross bar 24 and the rear wall of the casing 1 and having an offset formed in the material near the center thereof as indicated at 25$^a$. A strip of material similarly formed but shorter as indicated by the numeral 26 is secured to the cross bar 25 preferably by riveting or it may be formed integral with the cross bar 25. These opposed offset portions 25$^a$ and 26 (see Figs. 3 and 4) serve as a means of attachment for the spring 27 which has its upper end secured to the member 28 by means of the lateral projections 28$^a$ which enter between the coils of the spring (see Figs. 3 and 13) and the lower end of the spring is provided with an adjustable nut 29 in which engages the adjusting screw 30. The lower end of this screw has a reduced portion 30$^a$ which is firmly swiveled in a yoke 31, and below the yoke 31 it is rigidly secured to the turning wheel or thumb piece 32 whereby the screw may be rotated for adjusting it relatively to the spring. The member 28 which secures the upper end of the spring to the cross bar 25 is preferably formed of sheet metal and is provided with a cross member 28$^b$ connected to the lower body of the member by a neck of metal. The extremities of the upper portion 28$^b$ are pivotally secured to the opposed offset portions of the member 25 as illustrated in Fig. 4.

In order that the spring may be correctly adjusted in assembling it is desirable that there be an opportunity to insert a plier or some adjusting instrument on the top of the spring to rotate it relatively to the member 28. To secure this result it is desirable that the lower member of 28 should lie in approximately the same plane as cross member 25 a result which may be secured by putting a quarter turn in the neck connecting the two portions of this part as indicated at 28$^c$. The yoke 31 has depending arms 31$^a$ arranged a considerable distance apart and pivoted between the flanges 17$^a$ of the standard 17 on the rod 16 contiguous to said flanges, so as to prevent lateral movement on rod 16. By this means the lever 12 through the ear 12$^c$ is connected to and supported from this spring, and the center of the support of said lever and its connection with both the spring and the standard are one and the same and consequently when the standard tips in either direction it will merely oscillate about this center 16 without altering the position of the rack bar 11, and consequently the lost motion which ordinarily occurs at the centers 21 and 22 and which permits the platform to tip or careen when the weight is arranged to one side of center will not result in a false movement of the pointer 6 nor in the false indication of weight. It will also be observed that as the lever 12 rises and falls, carrying the center 16 back and forth on the arc described by said lever, and consequently deflecting the spring from the perpendicular, the spring will nevertheless at all times be maintained in a straight line by reason of the swivel connection at its lower end with the center 16 constituted by the yoke 31 and the pivot rod 16. The back of the standard 17 has an aperture 33 through which the operating wheel or thumb piece 32 projects, so that it will be accessible to the finger of the operator for rotating the screw. In order that this wheel may not be tampered with or accidentally moved it is arranged entirely within the casing 1 and in order that it may be reached for operation when necessary the casing is provided in the back with an opening 34 which if desired may be closed by suitable door or shutter 35 which has a slot 36 at its upper end whereby it is supported on a suitable hanger 37 and a notch 38 in its lower edge, whereby it may be dropped over the button 39 and held in place. The projections 17$^d$ of the standard are each formed with a flange 17$^e$ as shown in Fig. 11 and on this is produced a lug 17$^f$ which when the flange 17$^e$ is folded around the stem 18 produces a socket for receiving said stem, engages in a notch 17$^g$ in the opposite edge of the blank (see Fig. 11), and the edges of this notch 17$^g$ are then upset over the edges of the lug 17$^f$, so as to lock the two sides of the blank together and produce the socket.

In this embodiment of the invention numerous improved features of construction appear upon which the operation of the scale is not entirely dependent but which enable the various parts to be manufactured at the minimum expense and at the same time secure the desired strength and efficiency.

In the construction of the lever 12 (see Fig. 14) the exterior edges are turned or flanged upwardly so that the lips or ears 12$^a$ and 12$^b$ are joined by the flanges 12$^d$ while at the other extremity of this part the ears 12$^b$ are supported by the flanges 12$^d$ also formed integral therewith and with the main body of the lever. In the present embodiment one of the flanges 12$^b$ terminates in ear 12$^c$ which is pivotally connected with the platform standard as already described. By this construction it will be seen that a single piece rocking lever having great strength and rigidity is secured and the ears for attachment both to the casing and platform standard and rack bar may be made as strong as desired. Likewise in the present construction of the dial the use of the back plate 5 already described enables the dial to be secured to the casing by riveting in the cheapest possible manner. This is preferably done by providing lateral members of the casing 1 with suitable projecting lugs which may be inserted into corresponding holes or slots in the plate 5 which lugs after the plate is inserted on the casing are clenched or upset thus firmly securing the plate in position. The plate 5 is preferably formed with the flanged edges 5$^a$ already described turned outwardly into position and after the plate is secured to the casing the dial may be inserted in the retaining space thus formed on the plate after which suitable lugs on the dial may be passed through corresponding holes in the plate 4 and bent or upset as indicated by the lug 4$^a$, Fig. 3. By this construction the dial being inserted after the plate 5 is secured to the casing, the upset or clenched ends of the securing lugs will thus be concealed by the dial. This manner of constructing the dial of two plates also secures greater strength as will be apparent as well as neater appearance and also enables the yoke member 5$^b$ to be struck up from the material in the plate 5 in the manner already described. The preferred form of cutting the material in the plate 5 and forming up the yoke 5$^b$ is shown most clearly in Fig. 7, and in order to firmly secure the guide plate 9 in position with reference to the yoke 5$^b$ and the plate 5 the indentation 5$^c$ is preferably formed in the top edge of the member 5$^b$ and into this indentation a suitably formed ledge 9$^c$ on the guide plate 9 is inserted thus locking the lower end of the plate 9 into position while the plate is further secured by suitable lugs as 9$^d$ formed on one edge thereof and near the upper end and adapted to be inserted in corresponding slots or holes in the plate 5 after which they are clenched or upset thus firmly securing the plate 9 to the plate 5 and the yoke 5$^b$. The lower edge of the yoke 5$^b$ is preferably formed with the ledge 5$^d$ extending some distance below the hole 10 surrounding the arbor and this lower ledge 5$^d$ is engaged by suitable corresponding ledge 9$^e$ at the lower extremity of the guide plate 9. The bearing 9$^a$ for the conical inner end 7$^a$ of the arbor already described is formed at the lower extremity of a suitable notch or depression 9$^f$ (see Figs. 3 and 6).

In the foregoing specification the preferred embodiment of the invention has been described, but it is obvious that many changes and variations may be made by those skilled in the art without departing from the principle of the invention, and

What I claim is:

1. In a scale, the combination of a pointer, an arbor therefor having a pinion, a platform-standard, means connected with said standard for yieldingly sustaining the same, a pivoted lever pivoted at one end to said standard, a rack-bar connected to the other end of said lever and engaging said pinion, and a guard for permanently securing the rack-bar on the pinion, said guard being contiguous to the extremities of the toothed portion of the rack bar.

2. In a scale, the combination of a pointer, an arbor therefor having a pinion, a platform-standard, means connected with said standard for yieldingly sustaining the same, a pivoted lever pivoted to one end of said standard, and a rack-bar connected to the other end of said lever and engaging said pinion, the said rack-bar comprising a yoke provided with a longitudinal slot adapted to receive the pinion and a plurality of teeth for engaging the teeth of the pinion at one side of the said slot.

3. In a scale, the combination of a pointer, an arbor therefor having a pinion, a platform-standard, a rack-bar engaging the said pinion embodying a yoke provided with a longitudinal slot adapted to receive the pinion and having a plurality of teeth on one of the lateral edges of the said slot to coöperate with the teeth of the pinion, and means for communicating the movement of the platform to the said rack-bar.

4. In a scale, the combination of a dial, the said dial comprising a face plate and a back plate the said back plate having its exterior peripheral edges crimped around the exterior of the peripheral edges of the said face plate, a pointer for the dial, an arbor therefor provided with a pinion, a yoke in which the said arbor is journaled and the said yoke being formed integrally with the said back plate of the dial, a platform, a rack-bar engaging the said pinion, means for communicating the movement of the said platform to said pinion, a guide member secured to the said back plate of the dial adjacent the pinion and being provided with a guide slot to receive the said rack-bar, and a bearing for the inner end of the said arbor on the lower extremity of the said guide member.

5. In a scale, the combination of a pointer, a pinion for operating the same, a reciprocatory rack-bar, a guide member adjacent to the said pinion, a curved slide in the said guide member, a bearing for said slide fixed to said rack-bar, a pivoted lever pivotally connected with said rack-bar for reciprocating it, a platform pivotally connected with said lever, and means for yieldingly sustaining said platform.

6. In a scale, the combination of a casing having a cross-bar secured in the side walls thereof, a second cross-bar having one end secured to the first mentioned cross-bar and its other end let into the rear wall of the said casing, the said second cross-bar being provided with opposed branches, a deflected platform-standard straddling said second cross-bar, a spring connected to said standard, a member for securing the said spring to the said second cross-bar comprising opposed trunnions pivotally connected to the said branches of the cross-bar and a plurality of lugs for engaging between the coils of said spring, means for maintaining the said standard in operative position throughout the limits of its movement, and a pointer operatively connected with the standard.

7. In a scale, the combination of a casing, a cross-bar supported within the casing and being provided with oppositely disposed branches, a platform-standard, a spring secured to said standard, and a member for securing the spring to the said cross-bar, the said member comprising a pair of oppositely disposed trunnions adapted to be pivoted in the branches of the said cross-bar, a depending neck, a body portion at the lower extremity of the neck lying in a plane at an angle to the plane of said trunnions, and a plurality of lugs on the lateral edges of the said body portion for engagement between the coils of the said spring.

8. In a scale, the combination of a pointer, a pinion for operating the same, a platform-standard, a rack-bar engaging said pinion and a pivoted lever operatively connected to the said rack-bar and to the said standard, the said lever comprising, a main body portion formed of sheet metal, having its peripheral edges turned at an angle to the plane of the main body portion and a plurality of ears formed in said turned edges by which pivotal connection is secured with the said standard, with the said rack bar, and with the casing or main frame of the scale.

9. In a scale, the combination of a dial, a pointer, an arbor therefor provided with a pinion, a rack-bar engaging the pinion, a platform-standard, a pivoted lever connected to the said platform-standard, and a pivotal connection between the said lever and said rack-bar, the said pivotal connection comprising a pair of spaced ears on the lever, a coöperating ear on the rack-bar pivotally secured between and contiguous to one of the said spaced ears, and a curved portion on the said rack-bar contiguous to the other of the said spaced ears.

10. In a scale, the combination of a dial, a pointer, an arbor therefor provided with a pinion, a rack-bar engaging the pinion, a platform-standard, a pivoted lever connected to the said platform-standard, and a pivotal connection between the said lever and said rack-bar, the said pivotal connection comprising a pair of spaced ears on the lever, an ear on the rack-bar, a pivot pin joining the said spaced ears and passing through the said ear on the rack-bar, a housing for the pivot pin formed by deflecting portions of the material in the rack-bar in opposite planes, the pin passing between the said deflected portions, and a curved bearing portion on the rack-bar contiguous to one of the said spaced ears on the lever.

In testimony whereof I have signed my name to this specification, in the presence of two subscribing witnesses, on this 25th day of April, A. D. 1907.

JAMES M. TRINER.

Witnesses:
 CHAS. H. SEEM,
 J. H. JOCHUM, Jr.